June 21, 1960 W. H. BENNETT 2,942,106
CHARGED PARTICLE ACCELERATOR
Filed Nov. 21, 1955 5 Sheets-Sheet 1
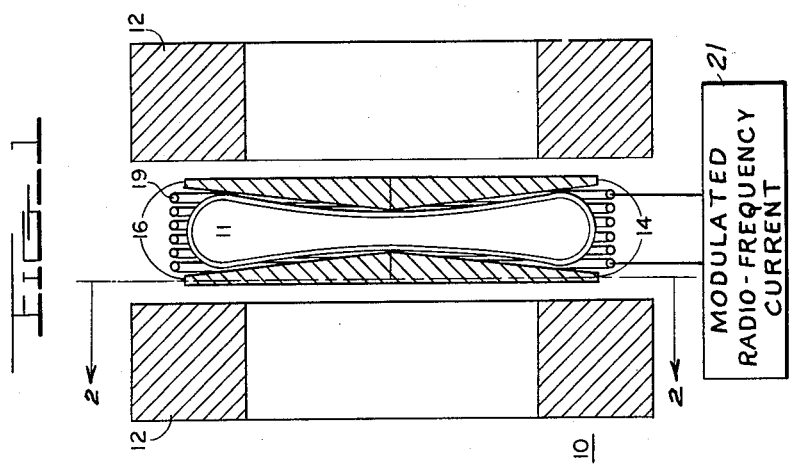
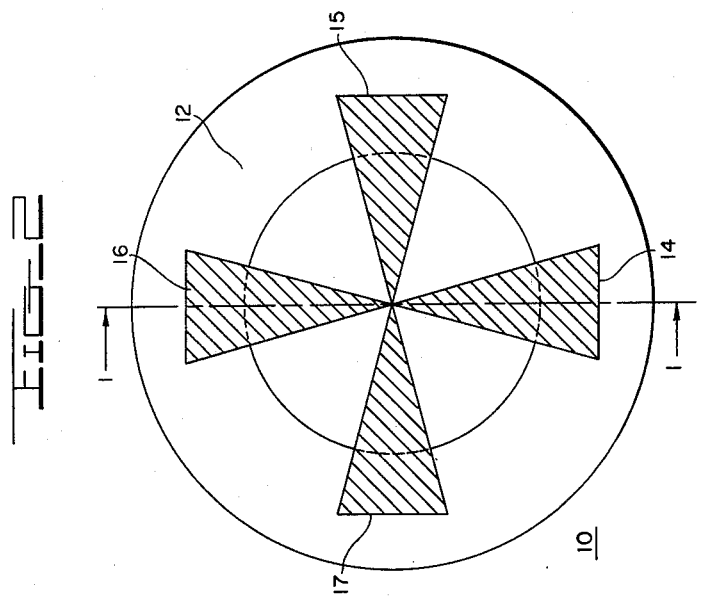
*INVENTOR*
WILLARD H. BENNETT.
BY *W.R. Mattox*
ATTORNEYS

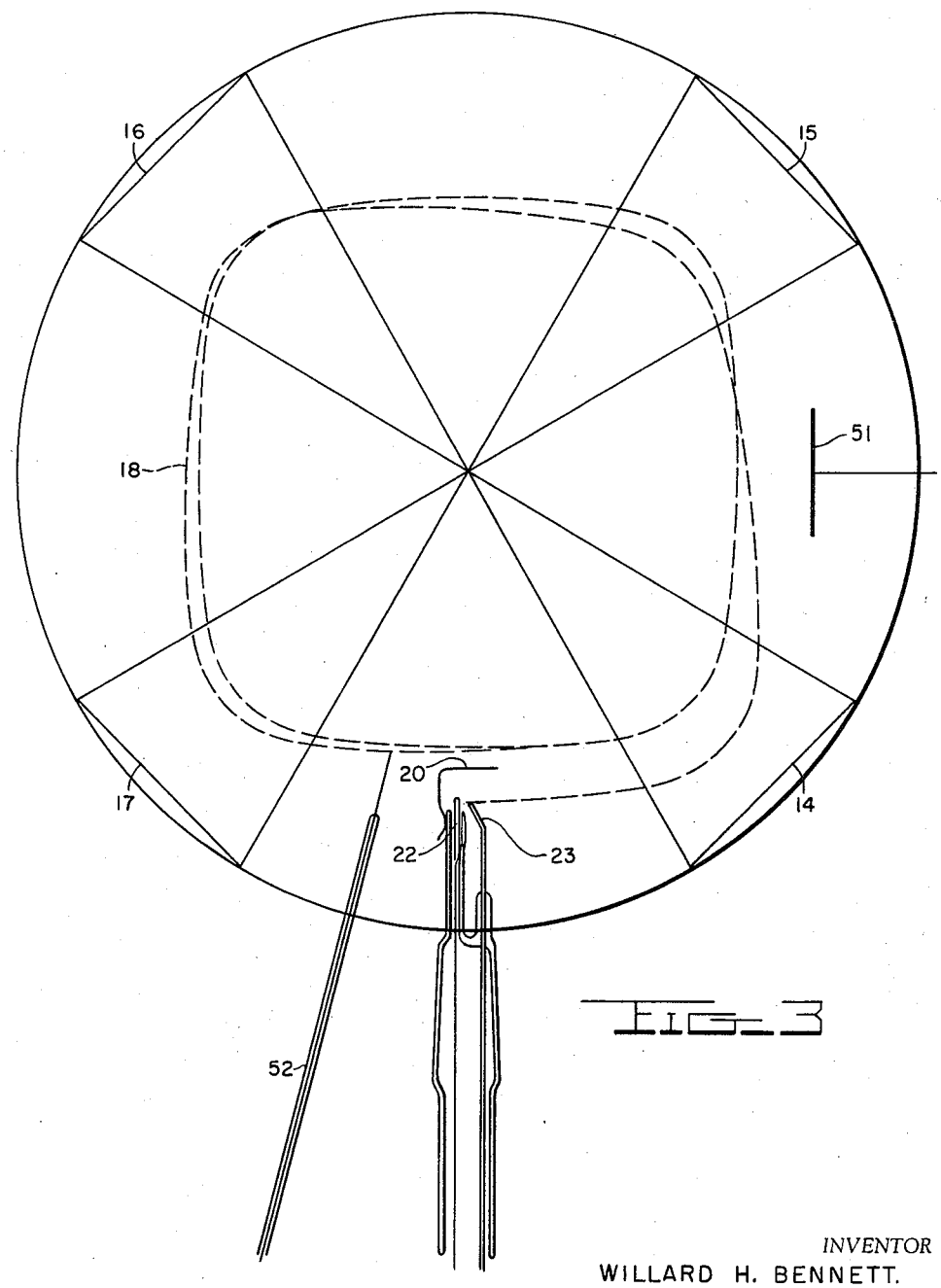

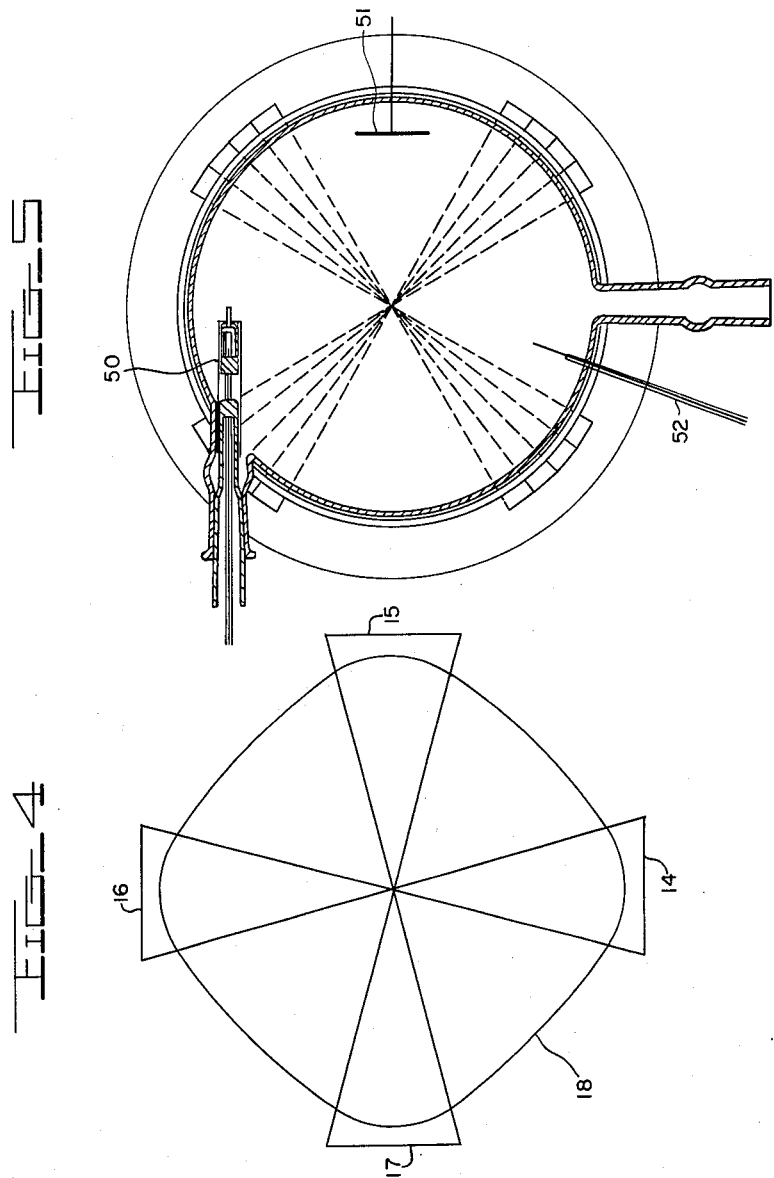

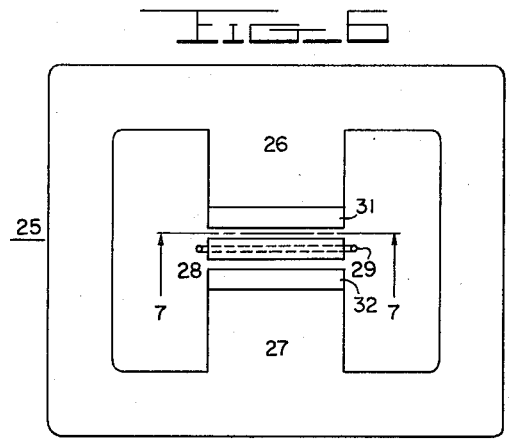
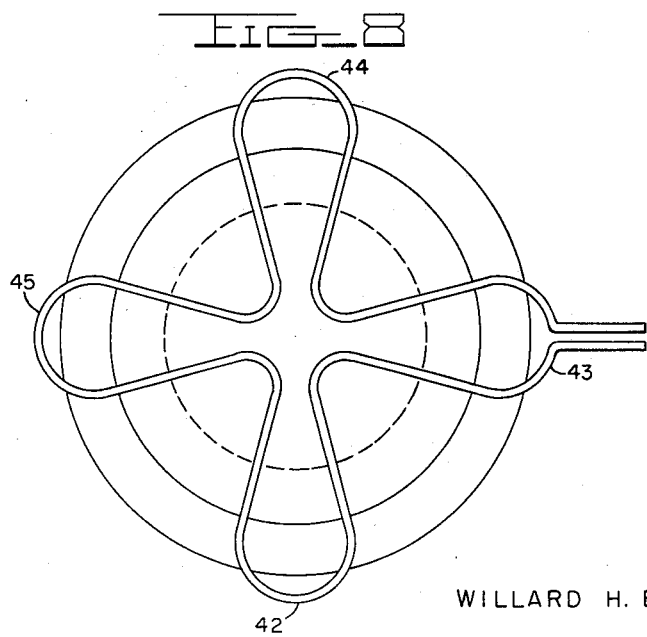

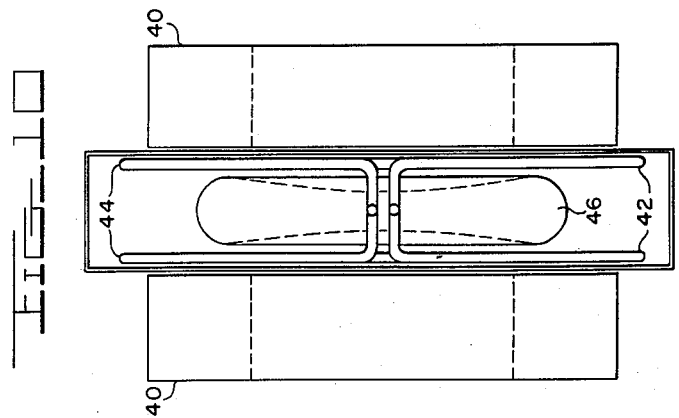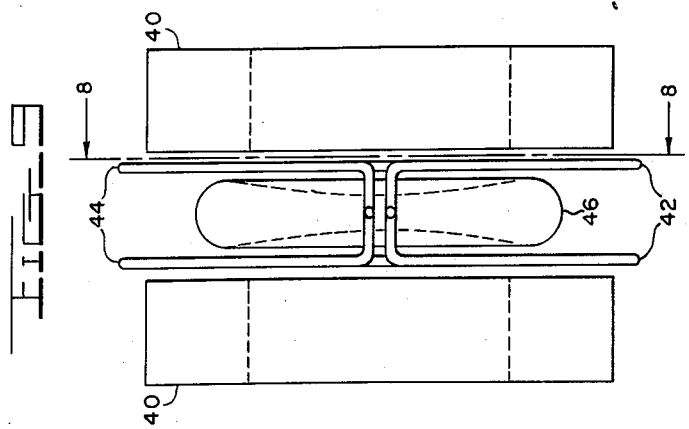

United States Patent Office 2,942,106
Patented June 21, 1960

2,942,106
CHARGED PARTICLE ACCELERATOR
Willard H. Bennett, %Naval Research Laboratory, Washington, D. C.

Filed Nov. 21, 1955, Ser. No. 548,283
6 Claims. (Cl. 250—27)
(Granted under Title 35, U.S. Code (1952), sec. 266)

The invention described herein may be manufactured and used by or for the Government of the United States of America for governmental purposes without the payment of any royalties thereon or therefor.

The present invention relates to a method and to a device for accelerating high energy particles and more particularly to a device for producing intense ion streams within a tube.

One form of the present invention is used for producing sustained streams of high-velocity ions mixed with electrons comparatively at rest and accelerates the ions around in a magnetic field whose intensity is azimuthally modulated so that the ions follow paths which approximate polygons with rounded corners. Superimposed on the azimuthally periodic steady magnetic field is a radio-frequency sinusoidal magnetic field which induces an electromotive force on the cycling ions. These forces can produce a net gain of energy of ions, if at the frequency of the radio-frequency field used, the permeability of the sectors of magnetic material used for producing azimuthal periodicity in the steady magnetic field is much less than the permeability of this material for the steady field, and if the time of flight of the ions from corner to corner in a polygon-like orbit is just the period of the radio frequency field. The average magnetic field is made to vary slightly with radius, and the radio-frequency field is frequency-modulated, which can be in a saw-tooth manner, to move ions initially in low-energy orbits nearer the axis toward the high-energy orbits lying far from the axis and leaving them circulating there while additional ions are picked up and moved out by succeeding modulation cycles. The ions are accelerated to be useful in producing nuclear reactions.

It is accordingly an object of the present invention to produce intense directed ion streams.

Another object of this invention is to produce intense ion streams in a highly concentrated form.

A further object of this invention is to produce intense ion streams of the magnetic self focusing type.

A still further object of this invention is to produce essentially direct currents of ions.

Still another object of this invention is to produce intense ion streams utilizing sinusoidal alternating forces.

A final object of the present invention is to produce ion streams consisting of one or more species of particles.

Other objects and advantages of the invention will hereinafter become more fully apparent from the following description of the annexed drawings, which illustrates the preferred embodiments, and wherein:

Fig. 1 shows a diagrammatic cross-sectional view of the components of the invention, Fig. 2 shows a diagrammatic sectional plan view of one of the modifications taken on line 2—2 of Fig. 1, Fig. 3 is a view similar to Fig. 2 illustrating the injection of ions into the evacuated chamber, Fig. 4 is a diagram illustrating the path of an ion in an orbit within the evacuated chamber, Fig. 5 is a diagrammatic view illustrating an ion gun which fires particles into the evacuated chamber, Fig. 6 is a modification of the invention showing magnetic pole pieces on opposite sides of an evacuated chamber, Fig. 7 is a sectional view illustrating the sectors on the ends of a pole piece shown in Fig. 6, Fig. 8 is a diagrammatic sectional view of another modification taken along line 8—8 of Fig. 9 showing wire loops on opposite sides of an evacuated chamber within a magnetic field, Fig. 9 is an end view of Fig. 8 showing the relationship of the parts, and Fig. 10 is a diagrammatic cross-sectional view of a modification similar to Fig. 8 showing an evacuated chamber with wire loops on opposite sides thereof and positioned within a conductive metallic box within a magnetic field.

Referring now to the drawings, wherein like reference characters designate like or corresponding parts throughout the several views, there is shown in Fig. 1 which illustrates a typical embodiment of an accelerator 10 comprising a disk-shaped evacuated chamber 11 which may be coated on the inside with a conducting film, and positioned in coaxial relationship with the chamber are adjacent D.-C. coils 12 or other means for producing a steady magnetic field across the evacuated chamber. The means for evacuating the chamber is not shown for simplification of the drawing. Located on each side of the evacuated chamber are four oppositedly disposed, equally spaced sector shaped pieces of magnetic material 14, 15, 16 and 17 such as "Hypersil" through which the magnetic field in the evacuated chamber is made irregular with azimuthal periodicity and has higher permeability for the steady magnetic field than for R.-F. fields but with axial symmetry. Any number of sectors can be used and can have any of the shapes well known in the art with which axially symmetric magnetic fields can be produced. An axially symmetric magnetic field being one in which the magnetic field has the same strength at points which are on directly opposite sides of the axis of the chamber. The average magnetic field is made slightly increasing with radial distance from the axis by suitably shaping the means for producing the steady magnetic field. The shapes of the sectors are not critical since the effect of the magnetic sectors is to produce regions of a relatively more intense magnetic field between which are regions of a less intense magnetic field. The effect of such an irregular field on the travel of the ions is to produce deviations in the ion paths from a purely circular form, approximating a polygon 18 with rounded corners (as shown in Fig. 4).

A coil 19 is positioned circumferentially about chamber 11 and energized with high frequency current, usually at radio frequency as will later appear. Additionally, the frequency is preferably modulated. The frequency modulation employed recurrently sweeps from a lower limit to an upper limit, the transition from the upper limit back to the lower limit taking place as rapidly as possible and for this reason is shown in block form 20 in Fig. 1. Radio frequency generators of this type are well known. The present invention may employ a saw-tooth control wave derived from a multivibrator or blocking oscillator having amplitude and frequency control adjustment and setting devices, and applying the control wave to a reactance tube coupled as a frequency control element of an electron tube oscillator. The frequency modulated output signal is preferably fed to coil 19 through a power amplifier and impedance matching circuit, although coil 19 itself could form the inductive element of the electron tube oscillator tank for some applications.

The radio frequency current is to be saw-tooth frequency-modulated in such a manner that the lower frequency limit of the current is such that the period of the radio frequency current corresponds to the time of flight of the species of ions to be accelerated while the ions travel from sector to sector near the axis. The frequency of the higher frequency limit of the saw-tooth corresponds to the time of flight of the ion from sector to sector when the ion is traveling in an orbit near the outer periphery of the evacuated chamber. The action on an ion traveling in an orbit produced by the radio-frequency current in the coaxial coil 19 is such that the induced force on the ion varies with the radial distance of the ion from the axis and the phase of the radio frequency current in the coil relative to the position of the ion in the orbit is such that the accelerating force occurs while the ion is in a sector and the decelerating force occurs while the ion is between sectors. The resultant effect is to increase the speed of the ion.

In the structure shown in Fig. 2, an ion traveling in such a magnetic field will follow a path which is more curved when in regions of more intense magnetic fields than when in regions of less intense magnetic fields. For this reason the ion is further from the axis when in more intense magnetic fields than it is when between such fields. The action of a changing flux through the orbit exerts a different electromotive force on the ion when in a sector because of the different radius in combination with the fact that the permeability of the magnetic material used in the sectors is much smaller for the radio-frequency field than it is for the D.-C. magnetic field. If an ion passes through sectors while the changing flux is accelerating it and passes between sectors while the changing flux is decelerating it, the ion acquires a greater acceleration in the first instance than the deceleration in the second instance and in this way experiences a net gain of energy.

The result of the net gain in energy is to cause the ion to swing out to successive orbits of greater average radius, and such an increase in energy and radius continues all the way to the outer orbit since the average magnetic field increases with increasing radius. Since the average magnetic field increases slightly with the radial distance from the axis of the chamber, the result is that the orbital time of flight of an ion decreases with a greater radius from the axis.

Sustained operation of this system results in acceleration of ions out to some stable outer orbit during each successive saw-tooth. These ions then continue to coast in the outer orbit while succeeding saw-tooth cycles pick up additional ions and raise them into that same outer orbit. The ions remain in the stable orbit because the frequency at the high frequency limit of the saw-tooth corresponds to the time of flight of the ion traveling from sector to sector when in the outer orbit and the field is not strong enough to raise the ions to higher orbits.

The modification shown in Figs. 6 and 7 has the same effective charcteristics in producing a stream of high energy particles as the device of Fig. 1, the difference being the manner in which the magnetic forces are applied across the evacuated chamber. The device shown in Fig. 6 consists of a permanent or an electro-magnet 25 that produces a magnetic field on the pole pieces 26 and 27. The pole pieces 26 and 27 are sector shaped on ends 31 and 32 as shown in Fig. 7 to produce regions of relatively more intense magnetic field between which are regions of less intense magnetic field. The effect of the irregular magnetic field on the ions is to produce deviations from a circular form towards an orbit in the form approximately a polygon with rounded corners. The magnetic pole pieces 26 and 27 merely replace the coaxial D.-C. coils 12 of the modification shown in Fig. 1 and the effect on the ions is the same.

The sectored pole pieces 26 and 27 are on opposite sides of an evacuated chamber 28 around which a coil 29 is placed in coaxial relationship with the chamber and in which sinusoidal alternating currents are passed at a frequency such that the period equals the time of the flight of an ion between sectors. This device functions in the same manner as that of Fig. 1 to produce the desired ion streams.

In the modification shown in Figs. 8 and 9, there are no magnetic sectors between the D.-C. magnetic coils 40 and the evacuated chamber 46, as in the modification shown in Fig. 1. The electro-magnetic forces which accelerate ions within the evacuated chamber 46 are produced by magnetic flux lines around wire loops 42, 43, 44 and 45 on opposite sides of the chamber. The wires are shaped to resemble the outer form of a four bladed propeller, but the form of a propeller with any number of blades may be used. The wire loops are placed directly opposite each other on opposite sides of the chamber so that more intense magnetic fields will be set up within the loops and less intense magnetic fields set up between successive loops. The two propeller shaped wires have common connections to a line carrying frequency-modulated radio-frequency currents so that the current through the wire loops will set up an azimuthally periodic radio-frequency field and accelerate the ions between the wire loops as disclosed for the magnetic sectors as shown in Fig. 1.

In the modification shown in Fig. 10 the evacuated chamber 46 and the propeller shaped loops of wire on opposite sides of the chamber are positioned within a conductive box 47 which may be copper. The box 47 is positioned within the magnetic field between the D.-C. magnetic coils 40 and confines the magnetic flux lines produced by the wire loops to the area within the box.

Ion sources can be formed in many ways, one of which is illustrated as an ion gun which can be any type well known in the art. The ion gun 50 is positioned near the outer edge of the evacuated chamber and at an angle so that it will project a beam of negative ions toward the middle of the chamber from the edge and about midway between sectors, the beam is directed to make the ions strike the wall of the chamber at grazing incidence adjacent to a magnetic sector. Some of the ions will rebound from the wall as positive ions, moving in approximately the correct direction to be picked up and accelerated by the radio-frequency and magnetic fields.

Another ion source is shown in Fig. 3 wherein the end of a palladium tube 22 is bombarded with electrons from a filament 23 nearby, while the palladium tube is filled with hydrogen.

A screen 20 is interposed between the electrodes and the principal portion of the evacuated chamber to act as a shield in preventing the potential on the electrodes from interfering with the operation of the accelerator. If sufficient electron current is passed at sufficient voltage, the palladium tube will be heated and will transmit hydrogen. The hydrogen upon emerging from the tube will be atomic and will be ionized by the dense electron current. The atomic hydrogen upon emerging from the palladium tube and being ionized by the electron bombardment is accelerated toward the filament but misses it due to the attraction of the magnetic field and is deflected along the path shown by the broken line 18 in Fig. 3. The axial focusing action of the system makes the ions approach a centered orbit and the next saw-tooth cycle of R.-F picks up the ions and moves them toward the outer orbit as disclosed in reference to Fig. 1.

Instead of the palladium tube as shown in Fig. 3 an electron injector could be used to inject electrons into the evacuated chamber. The electrons would be injected perpendicular to the outer orbit and would follow a path toward the axis until it is picked up by radio-frequency alternating current and accelerated to the outer orbit.

Another source of ion arises from the presence of electrons everywhere in the tube. These can be accelerated and decelerated by the radio-frequency field, spending part of their time with energies sufficient to ionize the gas in the tube. This method will supply some ions to the accelerating system. The process may be directly initiated by applying the radio-frequency field with the D.-C. magnetic field off in order to fill the chamber with an electrodeless discharge. After the chamber has been filled with ions and electrons, the D.-C. magnetic field is applied to accelerate the higher velocity ions which produce secondary effects in sufficient density to sustain the ionization needed to serve as an ion source.

The circulating beam of charged particles generated by the present invention may be employed as desired. For instance, the particles may be collected by deflecting them from their reentrant stable path by applying a control potential to an electrode 51 shown in Fig. 3. An attracting potential of a polarity determined by the particle charge will direct the beam outwardly of the stable orbit to a target or collector device. This device may therefore receive particles of particular types accelerated by the inventive system from among a variety of different charged particles present therein. The utilization collector may, if desired, further or alternately receive the particle at a velocity and energy to effect a physical or nuclear reaction with the target material. An electron beam established by the system may be directed on to a metallic collector to generate X-radiation.

The deflecting signal applied to the deflection device is preferably of short duration where continuous utilization of the system is desired. Upon cessation of the control influence, therefore, the stable outer orbit is reestablished and further particles accelerated thereinto may then be deflected for utilization.

The deflection signal, when of a duration approaching or exceeding the outer orbital period, need not be repeated until a succeeding cycle of frequency modulation accelerates more particles into the outer orbit. It is therefore convenient to derive the deflection control signal from a recurrent pulse generator having control devices. The pulse frequency control device may operate under control of the frequency modulator providing the saw-tooth control wave to supply deflection pulses at a desired phase and in a desired frequency relation thereto. Thus the deflection signal generator may be a normally quiescent blocking oscillator triggered by a signal derived from the saw-tooth oscillator through phase control circuitry, and if desired, count-down frequency dividing circuits, to operate once each saw-tooth cycle or at a lower pulse frequency during spaced successive cycles of the saw-tooth generator. It is clear, however, that the deflection signal generator need not be so synchronized because high velocity particles are continually being made available in the outer stable orbit.

For other purposes it may be desirable to intercept the beam when desired by a target probe 52 in Fig. 3, which may be movably mounted on the tube envelope by a removable bellows type seal.

It is to be noted that in this invention the orbits of those electrons which are liberated in ionizations will be very small and for this reason the electrons are confined to the immediate vicinity of magnetic lines of force passing through their respective points of origin. It is the ions which are the rapidly moving electrical charges and consequently it is the ions which are magnetically self-focusing and in excess. The electrons produced in the ionizations will be driven out of the mid-plane of the chamber until there are just enough left to neutralize the space charge of the average positive ion density at each position in the mid-plane of the chamber.

It should also be noted that this device can be an electron accelerator by applying radio-frequency fields with the appropriately much higher frequency. It is feasible to apply both an R.-F. field to accelerate ions, and, simultaneously, by appropriate means an R.-F. field of another frequency for electrons. The ratio of the frequencies can be obtained approximately by using the formula $\omega = e/m.H$. Where $\omega$ is the angular velocity, $e$— the charge of the electron, $m$— mass of the ion, and $H$— the guiding average magnetic field.

A typical example for the operation of the device during acceleration of protons is carried forth by the use of an evacuated accelerating chamber comprising a resilient gas pressure of $10^{-6}$ mm. of Hg, and the mean free path of the ions is of the order of $10^4$ cm. If the average magnetic field applied in the chamber is 1080 gauss, the energy of protons in the outer orbit will be 2,000 volts, the velocity will be $6 \times 10^7$ cm./sec. and the mean-free-time of an ion is $1.7 \times 10^{-4}$ sec. If the saw-tooth repetition frequency is 25,000 per sec., the current in the outer orbit will decrease 22% during each saw-tooth cycle and the maximum current in the outer orbit will be approximately 4.5 times the average current fed into the chamber from the inner orbits. This is only one typical example of accelerating ions and the invention is not limited to acceleration of protons but may be used for other ions and other valves.

It will be obvious to those skilled in the art that the steady magnetic field can be radially increasing toward the axis and the radio-frequency current can be such that the low frequency limit is at the outer orbit and the high frequency limit near the center of the chamber. In this system the ions would be accelerated from the axis toward the outer orbits of the chamber, but in this case the saw-tooth is from higher to lower frequency instead of the reverse as previously described.

Obviously many modifications and variations of the present invention are possible in the light of the above teachings. It is therefore to be understood that within the scope of the appended claims the invention may be practiced otherwise than as specifically described.

What is claimed is:

1. An accelerator for charged particles comprising an evacuated disk-shaped chamber containing charged particles in a steady magnetic field in which the magnetic lines of force are symmetric with the axis through the sides of said evacuated chamber, oppositely disposed sector-shaped magnetic pieces of material located in the same quadrant along opposite sides of said evacuated chamber with the sector-shaped magnetic pieces extending radially from the axis of said chamber having the same magnetic value and adapted to slightly increase the magnetic field uniformily with radial distance from the axis of said chamber, and a frequency modulated radio-frequency sinusoidal magnetic field superimposed on said steady magnetic field with the magnetic lines of force in the same direction.

2. The accelerator of claim 1 wherein the sector-shaped magnetic pieces of material are sectored ends of the poles of a magnet.

3. The accelerator of claim 1, wherein the steady magnetic field is produced by D.-C. coils on each side of said evacuated chamber.

4. An accelerator for charged particles comprising a disk-shaped evacuated tube, steady magnetic field with the lines of force parallel with the axis through the sides of said evacuated tube, sector-shaped magnetizable pieces of material located in the same quadrant and disposed along opposite sides of said evacuated tube with the sector-shaped magnetic pieces extending radially from the axis of said chamber to slightly increase the magnetic field uniformily with radial distance from the axis of said tube and with the same magnetic values radially, means superimposing a saw-toothed modulated radio-frequency field on said steady magnetic field, said means frequency modulating said field in such a manner that the low-frequency end of the modulation is such that the period of the frequency corresponds to the time of flight of a particle while traveling from sector to sector near the axis, and the period at the high frequency end of the saw-tooth corresponds to the time of flight of a particle while traveling from sector to sector in an orbit near the outer periphery of the evacuated tube.

5. An accelerator for charged particles comprising an evacuated disk-shaped chamber containing charged ions therein, said evacuated chamber being in a magnetic field comprising a steady magnetic field slightly increasing in field strength with radial distance from the axis of said chamber, and a radio-frequency field superimposed thereon with the lines of force in the same direction as said steady magnetic field, said magnetic field being azimuthally modulated for accelerating ions in orbits of successively larger radii outwardly from the axis of said chamber to a stable outer orbit within said evacuated chamber, an ion gun positioned on the outside of the outermost stable orbit for projecting ions into the evacuated chamber approximately parallel with the adjacent portion of the stable orbit.

6. An accelerator for charged particles comprising a steady magnetic field, an evacuated chamber with charged particles therein of at least two charge-mass ratios sector-shaped pieces of magnetizable material located in the same quadrants and disposed along opposite sides of said evacuated chamber with the sector-shaped pieces extending radially from the axis of said chamber to slightly increase the magnet field uniformly with radial distance from the axis of said evacuated chamber and with the same magnetic values radially, first and second radio-frequency magnetic fields superimposed on said steady magnetic field, said first radio field frequency being lower than said second radio field frequency whereby two different species of charged particles will be accelerated simultaneously.

References Cited in the file of this patent

UNITED STATES PATENTS

| | | |
|---|---|---|
| 2,565,410 | Tiley | Aug. 21, 1951 |
| 2,572,414 | Wideroe | Oct. 23, 1951 |
| 2,586,494 | Wideroe | Feb. 19, 1952 |
| 2,598,301 | Rajchman | May 27, 1952 |
| 2,615,128 | Ruderfer | Oct. 21, 1952 |
| 2,654,838 | Wideroe | Oct. 6, 1953 |
| 2,659,000 | Salisbury | Nov. 10, 1953 |
| 2,673,928 | Gurewitsch | Mar. 30, 1954 |
| 2,713,635 | Weissenberg et al. | July 19, 1955 |
| 2,736,799 | Philos | Feb. 28, 1956 |
| 2,738,420 | Lawson | Mar. 13, 1956 |
| 2,738,421 | Westendorp | Mar. 31, 1956 |
| 2,778,937 | Rossi | Jan. 22, 1957 |
| 2,790,902 | Wright | Apr. 30, 1957 |